(12) United States Patent
Safrany et al.

(10) Patent No.: US 7,875,129 B2
(45) Date of Patent: Jan. 25, 2011

(54) METHOD FOR FORMING A CONVERSION LAYER ON AN ALUMINUM ALLOY PRODUCT PRIOR TO FLUXLESS BRAZING

(75) Inventors: Sylvestre Safrany, Voiron (FR); Michel Mediouni, Moirans (FR); Sylvain Henry, Saint Jean de Moirans (FR); Sandrine Dulac, Grenoble (FR)

(73) Assignee: Alcan Rhenalu, Paris (FR)

( * ) Notice: Subject to any disclaimer, the term of this patent is extended or adjusted under 35 U.S.C. 154(b) by 203 days.

(21) Appl. No.: 11/572,675

(22) PCT Filed: Jul. 26, 2005

(86) PCT No.: PCT/FR2005/001935

§ 371 (c)(1),
(2), (4) Date: Feb. 26, 2007

(87) PCT Pub. No.: WO2006/018535

PCT Pub. Date: Feb. 23, 2006

(65) Prior Publication Data

US 2007/0204935 A1    Sep. 6, 2007

(30) Foreign Application Priority Data

Jul. 28, 2004    (FR) .................................. 04 08312

(51) Int. Cl.
*C23C 22/56* (2006.01)
*B23K 35/36* (2006.01)

(52) U.S. Cl. ................ 148/275; 148/243; 148/528; 219/615; 219/85.1; 219/85.2; 228/208; 228/209; 228/262.51; 428/385

(58) Field of Classification Search ................ 148/243, 148/275; 219/615, 85.1, 85.2; 228/208, 228/209, 262.51; 428/385
See application file for complete search history.

(56) References Cited

U.S. PATENT DOCUMENTS

| 3,006,790 | A |   | 10/1961 | Ewing |
|---|---|---|---|---|
| 3,779,839 | A |   | 12/1973 | Kaihuy et al. |
| 3,819,424 | A | * | 6/1974 | Russell et al. ............... 148/261 |
| 4,619,716 | A |   | 10/1986 | Suzuki et al. |
| 5,102,033 | A |   | 4/1992 | Woods et al. |
| 5,380,374 | A |   | 1/1995 | Tomlinson |
| 5,441,580 | A |   | 8/1995 | Tomlinson |
| 5,759,244 | A |   | 6/1998 | Tomlinson |
| 6,316,115 | B1 |   | 11/2001 | Lai et al. |
| 6,475,301 | B1 |   | 11/2002 | Grab et al. |
| 7,101,469 | B2 | * | 9/2006 | Kochilla et al. ............. 205/317 |

FOREIGN PATENT DOCUMENTS

| EP | 1154041 |   | 11/2001 |
|---|---|---|---|
| JP | 60083771 |   | 5/1985 |
| JP | 60102271 |   | 6/1985 |
| JP | 60130463 |   | 7/1985 |
| JP | 61038777 |   | 2/1986 |
| JP | 61049770 |   | 3/1986 |
| JP | 01-255652 | * | 10/1989 |
| JP | 07-185797 | * | 7/1995 |
| JP | 08144063 |   | 6/1996 |
| WO | 2006018535 |   | 2/2006 |

* cited by examiner

*Primary Examiner*—Roy King
*Assistant Examiner*—Lois Zheng
(74) *Attorney, Agent, or Firm*—Dennison, Schultz & MacDonald

(57) ABSTRACT

A method of assembling aluminum alloy products, such as sheets, strips or tubes, by means of fluxless brazing, where the absence of flux is made possible by using a prior treatment resulting in formation of a conversion layer on the surface of the products. The treatment involves using a solution containing $K^+$ and $F^-$ ions and at least one acid in a quantity such that the pH of the solution is less than 3. The inventive method enables effective flux was brazing in industrial conditions, such as a for the production of heat exchangers used in motor vehicles.

4 Claims, 1 Drawing Sheet

METHOD FOR FORMING A CONVERSION LAYER ON AN ALUMINUM ALLOY PRODUCT PRIOR TO FLUXLESS BRAZING

FIELD OF THE INVENTION

The invention pertains to a method of assembling aluminum alloy products such as sheets, strips or tubes by means of fluxless brazing, the absence of flux being made possible by an earlier treatment comprising the formation of a conversion layer on the surface of these aluminum alloy products. These products are mainly used in the manufacturing of heat exchangers, particularly those used to cool engines and air condition the passenger compartments of automobiles.

DESCRIPTION OF RELATED ART

The brazing method currently used to manufacture heat exchangers is controlled atmosphere brazing with non-corrosive flux, called Nocolok® brazing. This method is progressively replacing the vacuum brazing used in the past, but that required costly systems both with respect to the initial investment and to maintenance.

The main disadvantage of the Nocolok® method resides in the necessity of depositing a compound called "flux", consisting of potassium fluoraluminates, on the metal prior to brazing. This flux is intended to destroy the superficial oxide layer present on aluminum alloys just prior to the start of cladding melt. Thus, the liquid metal will not be retained by this film and can appropriately moisten the surfaces to be assembled and form sufficiently wide and resistant seams. The use of this product, which comes in powder form, by automobile equipment manufacturers presents a certain number of problems: in particular, it creates a relatively large dispersion of dust in the shops.

Numerous publications or patent applications offer solutions to avoid this problem. They can be divided into two major categories:

The first category concerns fluxless brazing methods. In this field we can cite the methods using aluminum alloy products coated with a nickel deposit (see, for example, WO 02/07928 of Corus Aluminum Walzproducte), as well as the addition of sodium in the cladding alloy described in application WO 01/98019 of Kaiser Aluminum & Chemical Corporation.

The second category concerns what are called pre-fluxed strips, that is, strips comprising a superficial layer containing the brazing flux. In Ford Motor Company patent U.S. Pat. No. 6,120,848, the flux is mechanically embedded in the strip during rolling. In applications WO 00/64626 of Corus Aluminum, WO 02/087814-WO 03/037559 of Norsk Hydro, or WO 03/089176 of Alcoa Inc. and American Inks and Coatings Corporation, the flux is incorporated in a binder and the whole thing is deposited on the aluminum alloy strip. In Alcoa Inc. patent U.S. Pat. No. 6,344,237, the flux is embedded in the metal by means of high speed spraying.

Ford Global Technologies patent EP 1067213 describes the treatment of an aluminum alloy strip in an aqueous solution of 2 to 25% by weight KF at a temperature between 32 and 100° C. for less than 5 seconds. This operation would make it possible to create a conversion layer on the surface of the metal that contains either almost exclusively $K_3AlF_6$, or primarily $K_3AlF_6$ plus a low percentage of $KAlF_4$.

The applicant has found that the use of the method described in this patent did not make it possible to achieve satisfactory fluxless brazing.

SUMMARY OF THE INVENTION

The invention therefore relates to a method of assembling products such as sheets, strips or tubes of heat exchangers by means of fluxless brazing, characterized in that, to avoid using flux, these aluminum alloy products first undergo a treatment comprising the formation of a conversion layer over all or part of their surface using a solution containing $K^+$ ions and $F^-$ ions and one or more acid(s) in a quantity such that the pH of the solution is less than 3.

According to an advantageous embodiment, this treatment is preceded by alkaline dipping. The acid is preferably sulfuric acid at a concentration of between 10 and 40 g/l. The treatment is preferably performed at a temperature ranging between 30 and 100°.

The $K^+$ and $F^-$ ions are advantageously added in the form of KF or in the form of a $KCl+NH_5F_2$ mixture.

DESCRIPTION OF THE INVENTION

Figure 1:
FIGS. 1a and 1b represent respectively a top view and a side view of the V-shaped test specimens used in the examples to evaluate brazing aptitude.

The invention consists in modifying the treatment solution described in patent EP 1067213 to obtain over all or part of the surface of aluminum alloy products such as sheets, strips or tubes used to manufacture heat exchangers, particularly for automobiles, a deposit allowing their brazing without any supplemental addition of flux. This modification consists in acidifying the bath without using the hydrofluoric acid mentioned in application EP 0140267 of Toyota Chuo, which is too toxic.

The invention consists in adding 10 to 40 g/l of sulfuric acid to the KF solution described in the above-mentioned patent. It would also be possible to use nitric acid $HNO_3$ at a concentration of 20 to 50% by volume, but this solution is not preferred due to the possible emission of nitrous vapors. It is also possible to use hydrochloric acid HCl (typically at a concentration of 1 to 50 g/l), one or more organic acids or even any combination of these mineral or organic acids that makes it possible to obtain a pH of less than 3, a pH zone that promotes the dissolution of the aluminum.

On the other hand, it is preferable to avoid phosphoric acid for reasons of compatibility with the brazing process, for which the harmful effects of phosphorous are known.

The other treatment conditions recommended in the patent may be retained. The minimum temperature ensures sufficiently strong reaction kinetics. The work can also be performed at ambient temperature if the length of treatment is increased.

One alternative consists in adding $F^-$ and $K^+$ ions by means of solutions of $NH_5F_2$ and KCl, for example, still with acidification of the solution.

Any surface preparation prior to the treatment is solely intended to provide a clean surface. If the metal resulting from industrial processing is not particularly greasy, a simple heat cleaning suffices; for added safety, it is possible to add an alkaline dip with soda or potash, for example.

EXAMPLES

Applicant's strips made of alloy 3916 with a composition of (% by weight) were subjected to different treatments:

| | Alloy | | | | | |
|---|---|---|---|---|---|---|
| | Si | Fe | Cu | Mn | Mg | Ti |
| 3916 | 0.19 | 0.15 | 0.65 | 1.35 | — | 0.08 | placed on both faces of a layer of 4045 brazing alloy with a thickness representing 10% of the total thickness.

Treatment 1 (According to Patent EP 1067213):
　Surface degreasing with acetone,
　Dipping in a 10 g/l solution of KOH at a temperature of 60° C. for 45 seconds without neutralization or rinsing,
　Immersion of the specimen in a 30 g/l solution of KF at a temperature of 60° C. for 30 seconds.

Treatment 1-bis:
　Same treatment as previously, but using a 50 g/l KF solution.

Treatment 2 (Replacing KF with NaF):
　Surface degreasing with acetone,
　Dipping in a 10 g/l solution of KOH at a temperature of 60° C. for 45 seconds, without neutralization or rinsing,
　Immersion of the specimen in a 30 g/l NaF solution at a temperature of 60° C. for 30 seconds.

Treatment 2-bis (Replacement of KF with NaF):
　Same treatment as treatment 2, but using a 50 g/l NaF solution.

Treatment 3 (According to the Invention):
　Surface degreasing with acetone,
　Dipping in a 10 g/l solution of KOH at a temperature of 60° C. for 45 seconds, without neutralization or rinsing,
　Immersion of the specimen in a 30 g/l solution of KF+30 g/l of $H_2SO_4$ at a temperature of 60° C. for 30 seconds.

Treatment 4 (Replacement of KF with NaF, with Acidification):
　Surface degreasing with acetone,
　Dipping in a 10 g/l solution of KOH at a temperature of 60° C. for 45 seconds, without neutralization or rinsing,
　Immersion of the specimen in a 30 g/l solution of NaF+30 g/l of $H_2SO_4$ at a temperature of 60° C. for 30 seconds.

Treatment 5 (According to the Invention):
　Surface degreasing with acetone,
　Dipping in a 50 g/l solution of NaOH at a temperature of 50° C. for 20 seconds,
　Neutralization in a 50% by volume solution of $HNO_3$ at ambient temperature for 15 seconds,
　Immersion of the sample in a 30 g/l solution of KF+30 g/l $H_2SO_4$ at a temperature of 60° C. for 30 seconds.

Treatment 6 (According to the Invention):
　Degreasing with Henkel Surface Technology Novaclean 708 for 30 seconds,
　Dipping in a 50 g/l solution of NaOH at a temperature of 50° C. for 20 seconds,
　Neutralization in a 50% by volume solution of $HNO_3$ at ambient temperature for 15 seconds,
　Immersion of the sample in a 15 g/l solution of $NH_5F_2$+38 g/l KCl+30 g/l $H_2SO_4$ at a temperature of 60° C. for 30 seconds.

Treatment 6-bis (According to the Invention):
　Same treatment as previously but the final immersion lasts only 15 seconds.

The test specimen described in FIG. 1 was used to evaluate the aptitude for fluxless brazing of the materials that underwent these different treatments. The "V" consists of a bare strip of alloy 3003 in state H24 and 0.3 mm thick. A 15-minute degreasing treatment at 250° C. is applied to the metal to be brazed. No other surface preparation is used, and, in particular, no flux is deposited. Brazing is performed in a double-wall glass oven that makes it possible to view the liquid brazing movements and the formation of seams during treatment. The heat cycle consists of a phase during which the temperature is raised to 600° C. at a rate of around 20° C./min., maintained at 600° C. for 2 minutes and reduced at a speed of around 30° C./min, all performed under continuous nitrogen flushing at a rate of 8 l/min.

The results are graded from A to E according to the following scale:

| | A | B | C | D | E |
|---|---|---|---|---|---|
| Length of the seam formed compared to the total length | 100% | 90% | 75% | 50% | 0% |

The results obtained are as follows:

| Treatment | Brazability |
|---|---|
| 1 | E |
| 1-bis | E |
| 2 | E |
| 2-bis | E |
| 3 | A |
| 4 | E |
| 5 | A |
| 6 | A |
| 6-bis | A |

We note that only the treatments according to the invention include acidification of the treatment solution, making it possible to obtain good brazing aptitude.

The invention claimed is:

1. In a method for assembling aluminum alloy sheets, strips or tubes of heat exchangers by fluxless brazing,
　the improvement comprising a surface pretreatment comprising subjecting the tubes, strips or sheets to a solution containing $K^+$ and $F^-$ ions and at least one acid in an amount sufficient that the solution has a pH less than 3, without addition of hydrofluoric acid to the solution, wherein the $K^+$ and $F^-$ ions are added to the solution in the form of a mixture comprising KCl +$NH_5F_2$,
　to form thereby a conversion layer over at least part of the surface of the tubes, strips or sheets,
　the conversion layer enabling brazing in the absence of flux.

2. Method as claimed in claim 1, additionally comprising a step of alkaline dipping prior to the surface pretreatment.

3. Method as claimed in claim 1, wherein the acid is sulfuric acid in a concentration of 10 to 40 g/l.

4. Method as claimed in claim 1, wherein the surface pretreatment is performed at a temperature of between 30 and 100° C.

* * * * *